(12) United States Patent
Bian et al.

(10) Patent No.: US 11,187,852 B1
(45) Date of Patent: Nov. 30, 2021

(54) BRAGG GRATINGS WITH SILICIDE-COATED SEGMENTS

(71) Applicant: GLOBALFOUNDRIES U.S. Inc., Santa Clara, CA (US)

(72) Inventors: Yusheng Bian, Ballston Lake, NY (US); Domingo Ferrer, Clifton Park, NY (US); Roderick A. Augur, Saratoga Springs, NY (US); Michal Rakowski, Ballston Lake, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 17/160,710

(22) Filed: Jan. 28, 2021

(51) Int. Cl.
*G02B 6/02* (2006.01)
*G02B 6/293* (2006.01)
*G02B 6/34* (2006.01)
*G02B 6/028* (2006.01)
*G02B 6/36* (2006.01)

(52) U.S. Cl.
CPC ..... *G02B 6/02076* (2013.01); *G02B 6/29304* (2013.01); *G02B 6/34* (2013.01); *G02B 6/028* (2013.01); *G02B 6/02323* (2013.01); *G02B 6/3652* (2013.01)

(58) Field of Classification Search
None
See application file for complete search history.

(56) References Cited

U.S. PATENT DOCUMENTS

| 10,795,082 | B1 | 10/2020 | Jacob et al. | |
|---|---|---|---|---|
| 2008/0259981 | A1* | 10/2008 | Wang | B82Y 20/00 372/44.01 |
| 2015/0162462 | A1* | 6/2015 | Berini | H01L 31/18 257/432 |
| 2017/0299808 | A1* | 10/2017 | Zhou | G02B 6/12007 |
| 2019/0288473 | A1* | 9/2019 | Niwa | G02B 6/122 |
| 2021/0018690 | A1 | 1/2021 | Bian et al. | |

OTHER PUBLICATIONS

Marchetti, R. et al., "High-efficiency grating-couplers: demonstration of a new design strategy", Sci Rep 7, 16670 (2017).
Hiroyuki Yoshinaga, et al., "Mid-infrared quantum cascade laser integrated with distributed Bragg reflector," Proc. SPIE 9755, Quantum Sensing and Nano Electronics and Photonics XIII, 97552V (Feb. 13, 2016).
Wissem Sfar Zaoui et al., "Cost-effective CMOS-compatible grating couplers with backside metal mirror and 69% coupling efficiency," Opt. Express 20, B238-B243 (2012).

(Continued)

*Primary Examiner* — Jerry Rahll
(74) *Attorney, Agent, or Firm* — Thompson Hine LLP; Francois Pagette

(57) ABSTRACT

Structures that include a Bragg grating and methods of fabricating a structure that includes a Bragg grating. The structure includes a waveguide core and a Bragg grating having a plurality of segments positioned with a spaced arrangement adjacent to the waveguide core. Each segment includes one or more exterior surfaces. The structure further includes a silicide layer located on the one or more exterior surfaces of each segment.

20 Claims, 4 Drawing Sheets

(56) References Cited

OTHER PUBLICATIONS

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

Bruccoleria et al., "Fabrication process for 200 nm-pitch polished freestanding ultrahigh aspect ratio gratings", Journal of Vacuum Science & Technology B 34, 06KD02 (2016).

Te-Ching Hsiao et al. "Metal-coated fiber Bragg grating for dynamic temperature sensor", Optik, vol. 127, Issue 22, 2016, pp. 10740-10745.

Hongqiang Li et al. "High-performance binary blazed grating coupler used in silicon-based hybrid photodetector integration," Opt. Eng. 53(9) 097106 (Sep. 11, 2014).

\* cited by examiner

BRAGG GRATINGS WITH SILICIDE-COATED SEGMENTS

BACKGROUND

The present invention relates to photonics chips and, more specifically, to structures that include a Bragg grating and methods of fabricating a structure that includes a Bragg grating.

Photonics chips are used in many applications and systems, such as data communication systems and data computation systems. A photonics chip monolithically integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

A Bragg grating may be utilized as an optical component integrated into a photonics chip. A Bragg grating may be formed from diverse materials with varying refractive index, which results in periodic variation in the refractive index. Each boundary between materials of different refractive index reflects a portion of an optical wave traversing the Bragg grating. The reflectivity of a Bragg grating may depend, among other factors, on the number of segments in the structure, which may lead to lengthy footprints to provide adequate reflectivity.

Improved structures that include a Bragg grating and methods of fabricating a structure that includes a Bragg grating are needed.

SUMMARY

In an embodiment of the invention, a structure includes a waveguide core and a Bragg grating having a plurality of segments positioned with a spaced arrangement adjacent to the waveguide core. Each segment includes one or more exterior surfaces. The structure further includes a silicide layer located on the one or more exterior surfaces of each segment.

In an embodiment of the invention, a method includes forming a waveguide core and a Bragg grating including a plurality of segments positioned with a spaced arrangement adjacent to the waveguide core. The method further includes forming a silicide layer located on one or more exterior surfaces of each segment.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
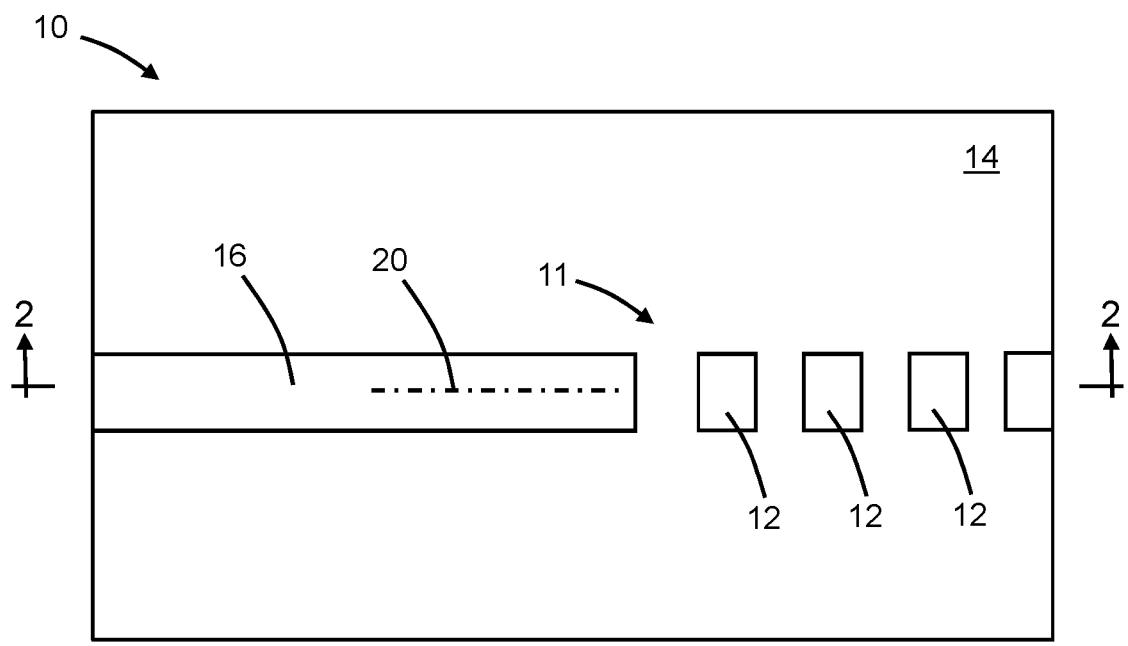
FIG. 1 is a top view of a structure at an initial fabrication stage of a processing method in accordance with embodiments of the invention.
Figure 2:
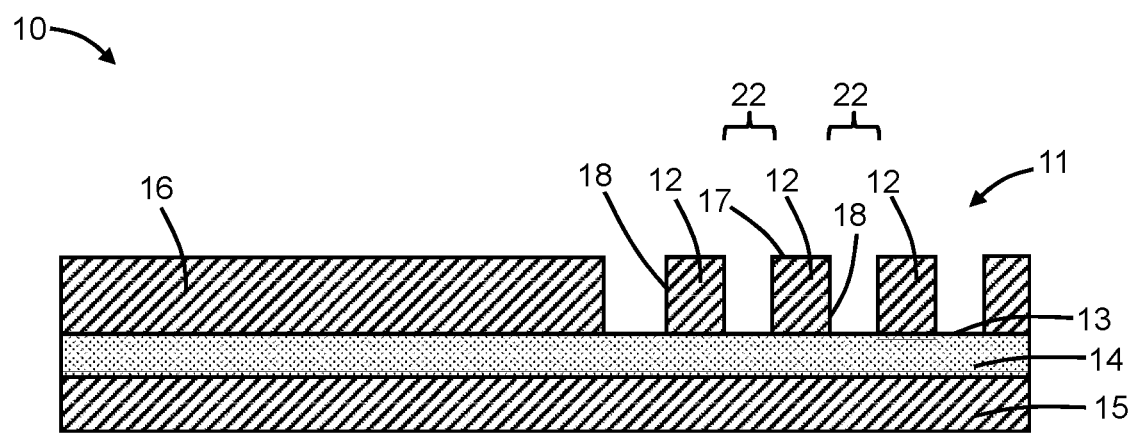
FIG. 2 is a cross-sectional view taken generally along line 2-2 in FIG. 1.

With reference to FIGS. 1, 2 and in accordance with embodiments of the invention, a structure 10 includes a Bragg grating 11 having periods or segments 12 and a waveguide core 16 positioned adjacent to the segments 12. The segments 12 and waveguide core 16 are located on a top surface 13 of a dielectric layer 14. The dielectric layer 14 may be comprised of a dielectric material, such as silicon dioxide.

The segments 12 and waveguide core 16 may be aligned along a longitudinal axis 20. The segments 12 are positioned with a spaced arrangement along the longitudinal axis 20. Each segment 12 has exterior surfaces that include a top surface 17, a bottom surface that is opposite to the top surface 17 and coextensive with the top surface 13 of the dielectric layer 14, and side surfaces or sidewalls 18 that extend from the top surface 17 to the bottom surface. Sidewalls 18 of the segments 12 intersected by the longitudinal axis 20 are separated by grooves 22, which provide the spacing between adjacent segments 12 in the spaced arrangement. The grooves 22 may extend to the dielectric layer 14 to define respective gaps arranged between adjacent pairs of segments 12. In an embodiment, the pitch and duty cycle of the segments 12 may be uniform to define a periodic arrangement. In alternative embodiments, the pitch and/or the duty cycle of the segments 12 may be apodized (i.e., non-uniform) to define a non-periodic arrangement. The duty cycle and pitch of the segments 12, as well as the dimensions of the segments 12, may be selected to optimize phase matching with the waveguide core 16.

The segments 12 and waveguide core 16 may be comprised of a single-crystal semiconductor material, such as single-crystal silicon. In an embodiment, the single-crystal semiconductor material may originate from a device layer of a silicon-on-insulator (SOI) substrate that further includes a buried oxide layer providing the dielectric layer 14 and a handle substrate 15 comprised of a single-crystal semiconductor material, such as single-crystal silicon. The segments 12 and waveguide core 16 may be patterned from the device layer by lithography and etching processes. The device layer of the silicon-on-insulator may be fully etched to define the segments 12 and waveguide core 16 such that the grooves 22 extend to the dielectric layer 14.

Figure 3:
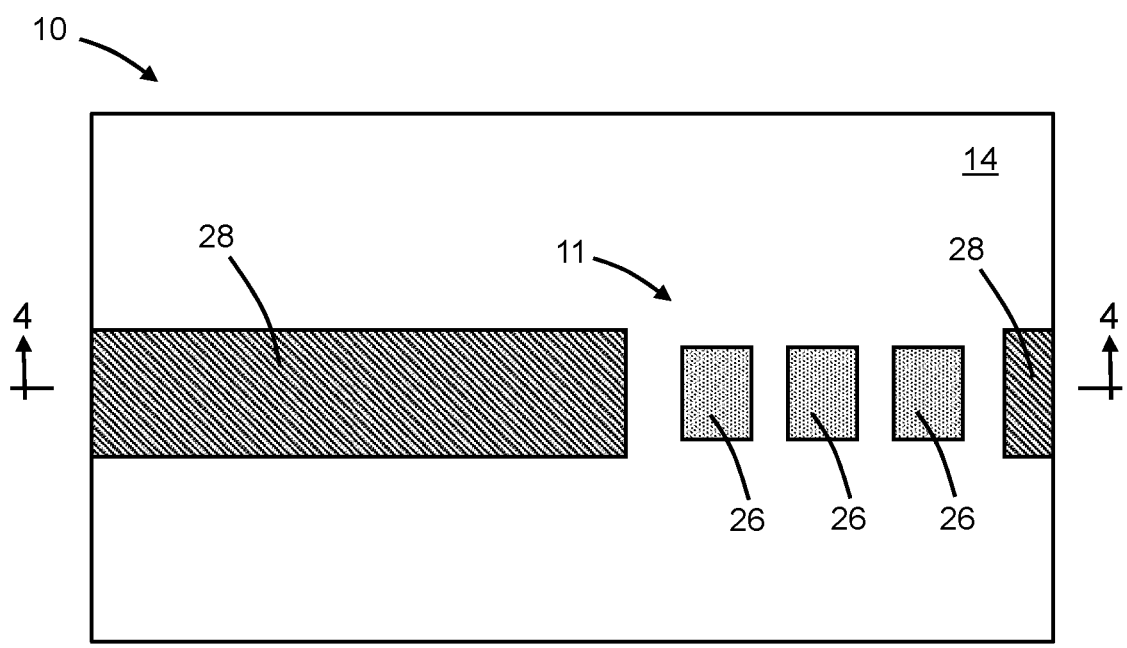
FIG. 3 is a top view of the structure at a fabrication stage of the processing method subsequent to FIG. 1.
Figure 4:
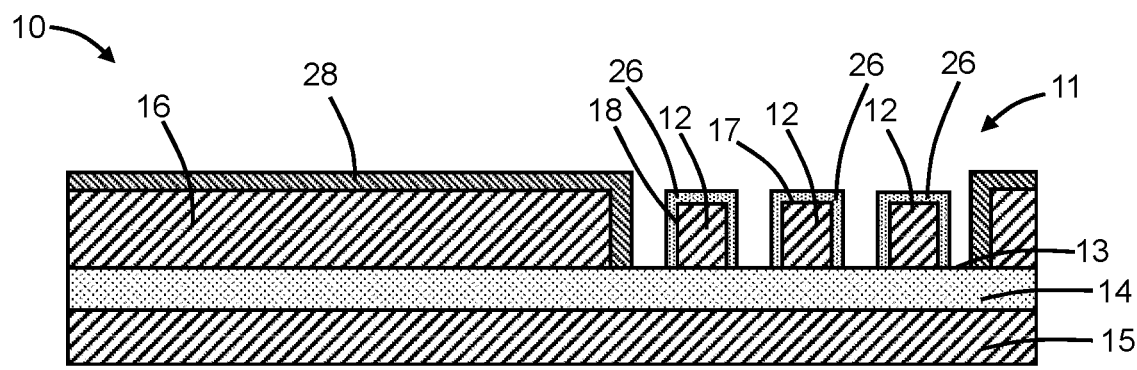
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a silicide layer 26 includes a respective portion formed as a cladding located on the top surface 17 and the sidewalls 18 of each segment 12. The silicide layer 26 may be formed by a silicidation process involving the deposition of a layer of a silicide-forming metal by, for example, chemical vapor deposition or physical vapor deposition, followed by one or more annealing steps (e.g., rapid thermal annealing). The annealing steps form a silicide phase by causing the layer of silicide-forming metal to react with the contacted semiconductor material of the segments 12. Residual silicide-forming metal remaining after forming the silicide layer 26 may be removed by wet chemical etching. In an embodiment, the segments 12 are only partially silicided such that a thickness of the single-crystal semiconductor material of each segment 12 remains intact and non-reacted beneath an outer coating provided by the silicide layer 26. The silicidation reaction can be limited by, for example, limiting the thickness of the deposited layer of silicide-forming metal that is available to react with the semiconductor material of segments 12.

In an embodiment, the silicide-forming metal may comprise nickel, which forms nickel silicide on the exterior surfaces of the segments 12 as a result of the silicidation process. In an embodiment, the silicide-forming metal may comprise cobalt, which forms cobalt silicide on the exterior surfaces of the segments 12 as a result of the silicidation process. In other embodiments, the silicide-forming metal may comprise another metal capable of reacting with silicon to form a low-resistivity, thermally-stable silicide on the exterior surfaces of the segments 12 as a result of the silicidation process.

A dielectric layer 28 may be formed over the waveguide core 16 to block silicide formation when the silicide layer 26 is formed. The dielectric layer 28 may cover the waveguide core 16, and the dielectric layer 28 may located be in direct contact with the waveguide core 16. The dielectric layer 28 may be comprised of a dielectric material, such as silicon nitride. The silicidation process is self-aligned because the silicide-forming metal does not react with the dielectric material of the dielectric layers 14, 28. As a result, the waveguide core 16 is free of the silicide layer 26 following the silicidation process because of the silicide-blocking provided by the dielectric layer 28. In addition, the top surface 13 of the dielectric layer 14 may be exposed in the spaces within the grooves 22 following the silicidation process.

The segments 12 are partially silicided by the silicidation process. In that regard, the segments 12 are thinned and narrowed by the formation of the silicide layer 26 due to the consumption of the semiconductor material, and an interface is defined between the non-consumed semiconductor material of each segment 12 and the portion of the silicide layer 26 coating the non-consumed semiconductor material. The silicide layer 26 may be in direct contact with the top surface 17 and sidewalls 18 of each segment 12. In an embodiment, the silicide layer 26 may be formed with a uniform thickness as a coating on the top surface 17 and sidewalls 18 of each segment 12. In an embodiment, the silicide layer 26 may fully coat the one or more exterior surfaces defined by the top surface 17 and sidewalls 18 of each segment 12. In an embodiment, the silicide layer 26 may be formed with a substantially uniform thickness on the top surface 17 and sidewalls 18 of each segment 12.

Figure 5:
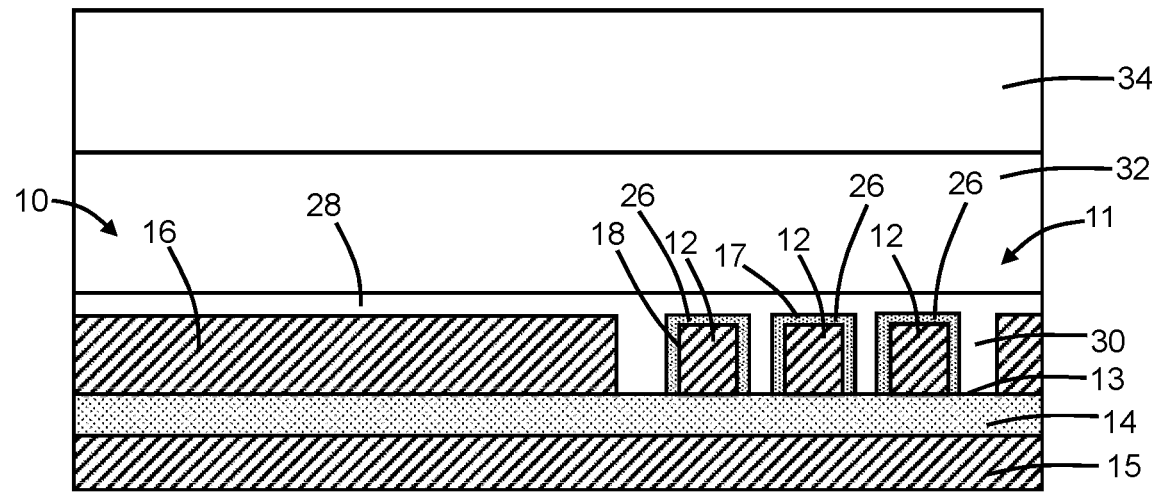
FIG. 5 is a cross-sectional view of the structure at a fabrication stage of the processing method subsequent to FIG. 4.

With reference to FIG. 5 in which like reference numerals refer to like features in FIG. 4 and at a subsequent fabrication stage, the dielectric layer 28 may be removed from the waveguide core 16, after forming the silicide layer 26, by a selective etching process. In an alternative embodiment, the dielectric layer 28 may remain on the waveguide core 16 in the structure 10 after forming the silicide layer 26.

A dielectric layer 30 is deposited and planarized to fill the grooves 22 between the silicided segments 12 and to cover the field surrounding the Bragg grating 11 and waveguide core 16. The dielectric layer 30 may be comprised of dielectric material, such as silicon dioxide, that is deposited and planarized to eliminate topography. A dielectric layer 32 is formed by middle-of-line processing over the dielectric layer 30. The dielectric layer 32 may be comprised of dielectric material, such as silicon dioxide, deposited by chemical vapor deposition using ozone and tetraethylorthosilicate (TEOS) as reactants. A back-end-of-line stack 34 may be formed by back-end-of-line processing over the dielectric layer 32. The back-end-of-line stack 34 may include one or more stacked interlayer dielectric layers comprised of one or more dielectric materials, such as a silicon dioxide.

The structure 10, in any of its embodiments described herein, may be integrated into a photonics chip that may include electronic components and additional optical components in addition to the structure 10. The electronic components may include, for example, field-effect transistors that are fabricated by complementary-metal-oxide-semiconductor (CMOS) processing using the device layer of the silicon-on-insulator substrate. The back-end-of-line stack 34 may include metal lines, vias, and contacts that are connected to the field-effect transistors and electrically-active optical components.

In use, laser light may be guided on the photonics chip by the waveguide core 16 from, for example, a fiber coupler or a laser coupler to the structure 10. The Bragg grating 11 may reflect the laser light. The silicide layer 26 coating the segments 12 may increase the reflectivity of the Bragg grating 11, which may result in a smaller device footprint by reducing the number of segments 12 needed to provide an equivalent or enhanced reflectivity. The silicide layer 26 may also relax feature size requirements for the segments 12 and grooves 22 and, as a result of larger feature sizes (e.g., larger segments 12 and/or grooves 22), ease fabrication challenges when patterning the Bragg grating 11 in a high-index-contrast photonics system.

Figure 6:
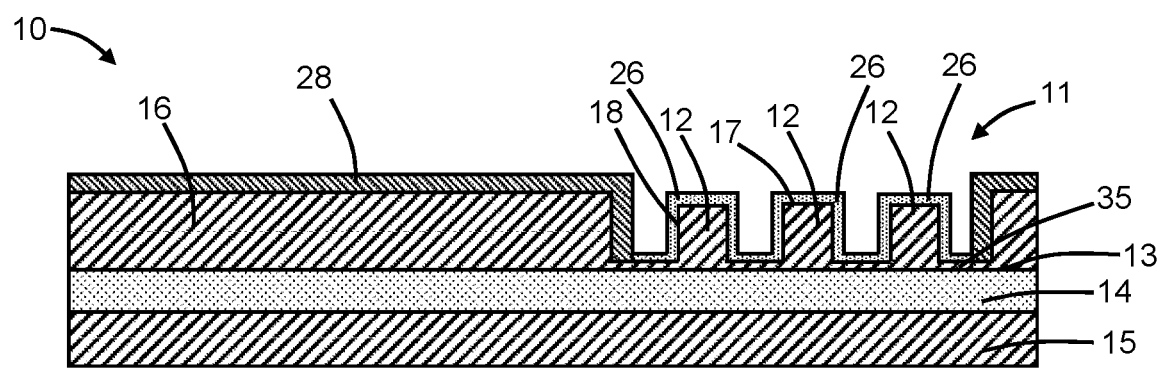
FIGS. 6-8 are cross-sectional views of structures in accordance with alternative embodiments of the invention.

With reference to FIG. 6 in which like reference numerals refer to like features in FIG. 4 and in accordance with alternative embodiments of the invention, the Bragg grating 11 and waveguide core 16 may include a slab layer 35 that directly connects respective lower portions of the segments 12 and waveguide core 16. The slab layer 35 may be formed, for example, by partially etching the device layer of the silicon-on-insulator substrate by stopping the etching process before penetrating fully through the device layer. The silicide layer 26 includes portions that are formed on the slab layer 35 and that connect the different portions of the silicide layer 26 on the segments 12. In an embodiment, the slab layer 35 is partially silicided by the silicidation process.

Figure 7:
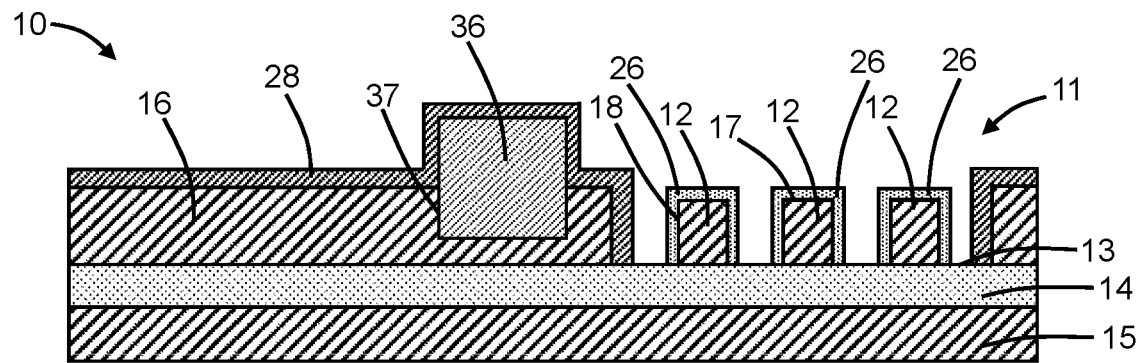
Figure 8:
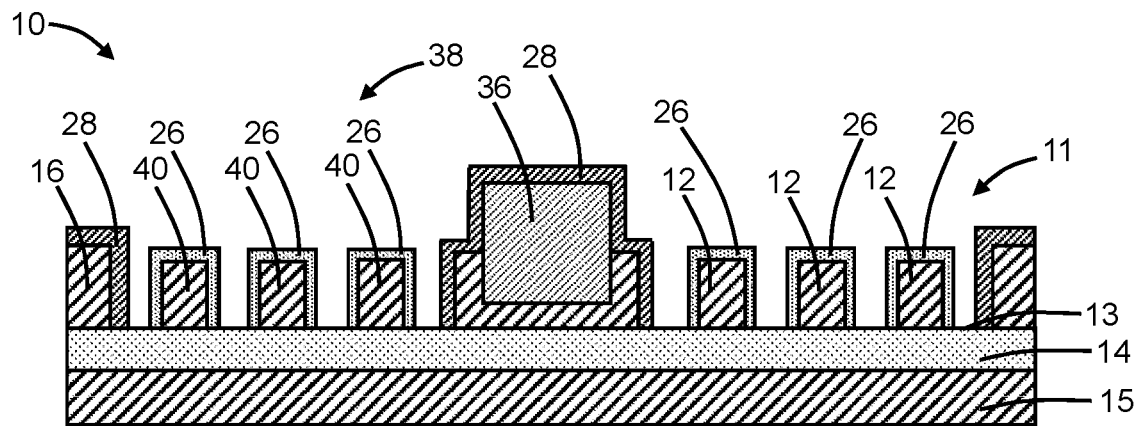

With reference to FIG. 7 in which like reference numerals refer to like features in FIG. 4 and in accordance with alternative embodiments of the invention, a photodetector 36 is formed that is positioned adjacent to the segments 12 of the Bragg grating 11. The photodetector 36 may be formed in a trench 37 that is patterned in the waveguide core 16 by lithography and etching processes in the device layer. The portion of the waveguide core 16 that includes the trench 37 may be enlarged relative to the adjacent portions of the waveguide core 16. The photodetector 36 may be comprised of germanium that is epitaxially grown from the single-crystal semiconductor material of the device layer surrounding the trench 37.

The dielectric layer 28 may cover the waveguide core 16 and the photodetector 36, and the dielectric layer 28 may located be in direct contact with the waveguide core 16 and the photodetector 36. As a result, the waveguide core 16 and the photodetector 36 are free of the silicide layer 26 following the silicidation process because of the silicide-blocking provided by the dielectric layer 28.

In use, the waveguide core 16 may be used to guide optical signals to the photodetector 36. The photodetector 36 converts the optical signals received via the waveguide core 16 into pulses of electrical current by the photoelectric effect. The Bragg grating 11 reflects optical power that is not absorbed by the photodetector 36 back toward the photodetector 36. The silicide layer 26 increases the reflectivity of the segments 12 of the Bragg grating 11.

With reference to FIG. 7 in which like reference numerals refer to like features in FIG. 6 and in accordance with alternative embodiments of the invention, the structure 10 may be modified to add another Bragg grating 38 that includes segments 40 that are substantially identical to the segments 12. The photodetector 36 may be positioned in a horizontal direction between the segments 40 of the Bragg grating 38 and the segments 12 of the Bragg grating 11. Portions of the silicide layer 26 are formed as respective coatings on the segments 40.

The segments 40 of the Bragg grating 38 may be designed to have good transmission and moderate reflection, and the segments 12 of the Bragg grating 11 may be designed to maximize reflection. The Bragg grating 38 reflects optical power that is reflected by the Bragg grating 11 and not absorbed by the photodetector 36 back toward the photodetector 36. The silicide layer 26 increases the reflectivity of the segments 40. The reflections between the Bragg grating 11 and the Bragg grating 38 may continue in a manner similar to a Fabry-Perot cavity. The result is that the optical power absorbed by the photodetector 36 is effectively increased because of the multiple opportunities for absorption that are created by the reflections.

In an alternative embodiment, the silicide layer 26 may be omitted from the Bragg grating 38 such that only the Bragg grating 11 includes the silicide layer 26. In an alternative embodiment, the photodetector 36 may be replaced by a laser cavity.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a waveguide core;
   a first Bragg grating including a first plurality of segments positioned with a spaced arrangement adjacent to the waveguide core, each of the first plurality of segments including one or more exterior surfaces; and
   a silicide layer located in direct contact with the one or more exterior surfaces of each of the first plurality of segments.

2. The structure of claim 1 further comprising:
   a photodetector positioned adjacent to the first plurality of segments.

3. The structure of claim 2 wherein the photodetector is positioned in a trench in the waveguide core.

4. The structure of claim 2 further comprising:
   a second Bragg grating including a second plurality of segments positioned with a spaced arrangement adjacent to the photodetector,
   wherein the photodetector is laterally positioned between the first plurality of segments of the first Bragg grating and the second plurality of segments of the second Bragg grating.

5. The structure of claim 4 wherein each of the second plurality of segments includes one or more exterior surfaces, and the silicide layer is further located on the one or more exterior surfaces of each of the second plurality of segments.

6. The structure of claim 2 wherein the photodetector and the waveguide core are free of the silicide layer.

7. The structure of claim 6 further comprising:
   a dielectric layer covering the photodetector and the waveguide core, the dielectric layer in direct contact with the photodetector and the waveguide core.

8. The structure of claim 1 further comprising:
   a slab layer connecting respective lower portions of the first plurality of segments,
   wherein the silicide layer is further located on the slab layer.

9. The structure of claim 8 wherein the slab layer and the first plurality of segments are comprised of single-crystal silicon.

10. The structure of claim 8 further comprising:
    a dielectric layer,
    wherein the slab layer and the first plurality of segments are located in direct contact with the dielectric layer.

11. The structure of claim 1 further comprising:
a second Bragg grating including a second plurality of segments positioned with a spaced arrangement adjacent to the first Bragg grating.

12. The structure of claim 11 wherein each of the second plurality of segments includes one or more exterior surfaces, and the silicide layer is further located on the one or more exterior surfaces of each of the second plurality of segments.

13. The structure of claim 1 further comprising:
a dielectric layer,
wherein the one or more exterior surfaces include a top surface and a plurality of side surfaces that extend from the top surface to the dielectric layer.

14. A structure comprising:
a waveguide core;
a Bragg grating including a plurality of segments positioned with a spaced arrangement adjacent to the waveguide core, each of the plurality of segments including one or more exterior surfaces; and
a silicide layer located on the one or more exterior surfaces of each of the plurality of segments,
wherein the waveguide core is free of the silicide layer.

15. The structure of claim 14 further comprising:
a slab layer connecting respective lower portions of the plurality of segments,
wherein the silicide layer is further located on the slab layer, and the slab layer and the plurality of segments are comprised of single-crystal silicon.

16. The structure of claim 14 further comprising:
a dielectric layer covering the waveguide core and in direct contact with the waveguide core.

17. The structure of claim 14 wherein the silicide layer is located in direct contact with the one or more exterior surfaces of each of the plurality of segments.

18. A method comprising:
forming a waveguide core and a first Bragg grating including a first plurality of segments positioned with a spaced arrangement adjacent to the waveguide core;
forming a second Bragg grating including a second plurality of segments positioned with a spaced arrangement adjacent to the first Bragg grating; and
forming a silicide layer located on one or more exterior surfaces of each of the first plurality of segments.

19. The method of claim 18 further comprising:
forming a photodetector positioned adjacent to the first plurality of segments,
wherein the photodetector is laterally positioned between the first plurality of segments of the first Bragg grating and the second plurality of segments of the second Bragg grating.

20. The method of claim 18 wherein the silicide layer is further formed on one or more exterior surfaces of each of the second plurality of segments.

* * * * *